(12) United States Patent
Klimpel et al.

(10) Patent No.: US 11,996,651 B2
(45) Date of Patent: May 28, 2024

(54) SAFELY SEPARATING PLUG CONNECTOR PART

(71) Applicant: Phoenix Contact GmbH & Co. KG, Blomberg (DE)

(72) Inventors: Marc Klimpel, Detmold (DE); Andreas Wendt, Berlin (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 17/610,450

(22) PCT Filed: May 11, 2020

(86) PCT No.: PCT/EP2020/063014
§ 371 (c)(1),
(2) Date: Nov. 11, 2021

(87) PCT Pub. No.: WO2020/229392
PCT Pub. Date: Nov. 19, 2020

(65) Prior Publication Data
US 2022/0231452 A1 Jul. 21, 2022

(30) Foreign Application Priority Data

May 16, 2019 (DE) ...................... 10 2019 112 899.4

(51) Int. Cl.
*H01R 13/62* (2006.01)
*H01R 13/405* (2006.01)
(Continued)

(52) U.S. Cl.
CPC ........... *H01R 13/62* (2013.01); *H01R 13/405* (2013.01); *H01R 13/53* (2013.01); *H01R 24/28* (2013.01); *H01R 2105/00* (2013.01)

(58) Field of Classification Search
CPC .. H01R 13/6315; H01R 13/62; H01R 13/405; H01R 13/53; H01R 24/28; H01R 2105/00
(Continued)

(56) References Cited

U.S. PATENT DOCUMENTS 2,986,613 A * 5/1961 Figueira ................. H01R 29/00
200/51.09
3,083,274 A * 3/1963 Sparkes ............... H01R 13/633
439/153

(Continued)

FOREIGN PATENT DOCUMENTS

CN 1235749 A 11/1999
CN 1762075 A 4/2006
(Continued)

*Primary Examiner* — Gary F Paumen
(74) *Attorney, Agent, or Firm* — LEYDIG, VOIT & MAYER, LTD.

(57) ABSTRACT

A plug connector part for electrical connection to a mating plug connector part is provided. The plug connector part includes a housing and a contact carrier that is movable in relation to the housing. The contact carrier includes at least one electrical contact for the mating plug connector part and a slider that is movable in relation to the housing and to the contact carrier. The plug connector part for includes an elastic element that is supported on the slider and on the contact carrier in such a way that the elastic element is tensioned by a displacement of the slider in relation to the contact carrier.

15 Claims, 4 Drawing Sheets

(51) Int. Cl.
  *H01R 13/53* (2006.01)
  *H01R 24/28* (2011.01)
  *H01R 105/00* (2006.01)

(58) Field of Classification Search
  USPC .................................................. 439/247, 248
  See application file for complete search history.

(56) References Cited

U.S. PATENT DOCUMENTS

| | | | | |
|---|---|---|---|---|
| 3,360,764 | A | * 12/1967 | Georges | ............... H01R 13/635 439/155 |
| 3,644,871 | A | 2/1972 | Lafont et al. | |
| 2003/0049957 | A1 | 3/2003 | Kikuchi et al. | |

FOREIGN PATENT DOCUMENTS

| | | |
|---|---|---|
| CN | 108336567 A | 7/2018 |
| DE | 518012 C | 2/1931 |
| DE | 69400148 T2 | 1/1997 |
| DE | 10242429 B4 | 3/2006 |
| EP | 1681747 A2 | 7/2006 |
| JP | H03124581 U | 3/1990 |
| JP | H07122332 A | 5/1995 |
| WO | WO 2017052545 A1 | 3/2017 |

\* cited by examiner

SAFELY SEPARATING PLUG CONNECTOR PART

CROSS-REFERENCE TO PRIOR APPLICATIONS

This application is a U.S. National Phase application under 35 U.S.C. § 371 of International Application No. PCT/EP2020/063014, filed on May 11, 2020, and claims benefit to German Patent Application No. DE 10 2019 112 899.4, filed on May 16, 2019. The International Application was published in German on Nov. 19, 2020 as WO 2020/229392 under PCT Article 21(2).

FIELD

The invention relates to a plug connector part for electrical connection to a mating plug connector part.

BACKGROUND

When an established electrical connection is disconnected, the formation of an arc is to be expected depending on an applied voltage and, in particular, in the case of direct current applications. This is often challenging particularly in the case of plug connectors. On the one hand, an arc can lead to damage to the plug connector, namely both to housing parts and to contacts. On the other hand, however, an arc can also pose a risk to an operator of the plug connector. A further topic relates to so-called stationary arcs, which can occur if an electrical connection has been separated only incompletely. In order to keep such effects as low as possible, a mechanism that allows a rapid and safe disconnection of the connection is desirable.

Pretensionable spring pins or pretensioned contact pins are described in JPH 07122332 A and DE 518012 C. Such solutions have the disadvantage that the production of such contact/spring pins is comparatively complex.

DE 102 42 429 B4 discloses a plug with a plug housing, a slider, and an elastic element that is supported between the plug housing and the slider and establishes an elastic pretension when the slider is moved. The plug is to start to separate from a plug socket if the resulting elastic pretensioning force is greater than the connecting force of the contact elements. However, the connecting force of the contact elements can decrease over time as a result of wear, which can lead to a separating movement varying over the useful life. If, in addition, a user holds the plug housing or a line connected thereto in his hand when the connection is released, the function of the separation can be impeded as a result of the elastic pretension.

SUMMARY

In an embodiment, the present invention provides a plug connector part for electrical connection to a mating plug connector part, comprising: a housing, a contact carrier that is movable in relation to the housing and comprises: at least one electrical contact for the mating plug connector part, and a slider that is movable in relation to the housing and to the contact carrier, and an elastic element that is supported on the slider and on the contact carrier in such a way that the elastic element is tensionable by a displacement of the slider in relation to the contact carrier.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
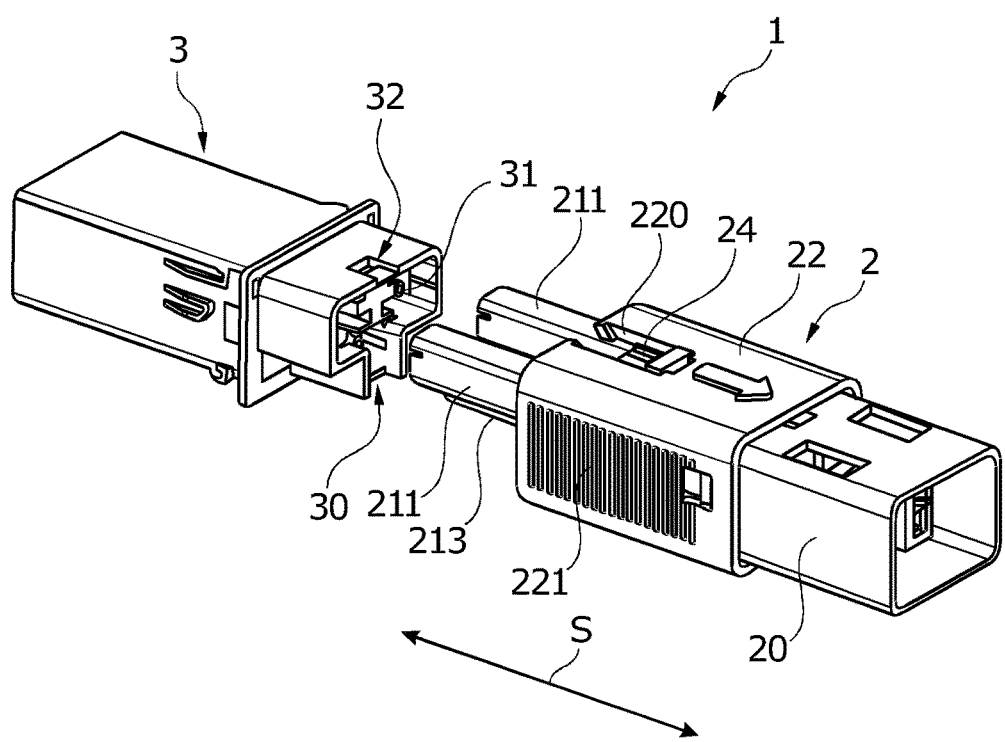
FIG. 1 shows a perspective view of a plug connector with a plug connector part and a mating plug connector part in a non-interconnected state.

In an embodiment, the present invention improves disconnection of an electrical connection of a plug connector.

Accordingly, a plug connector part is provided for electrical connection to a mating plug connector part and for safe separation from the mating plug connector part, wherein the plug connector part comprises a housing, a contact carrier, a slider, and at least one elastic element. The contact carrier comprises at least one electrical contact for the mating plug connector part and is mounted movably in relation to the housing, for example movably on the housing. The slider is mounted movably in relation to the housing and in relation to the contact carrier, for example movably on the housing in such a way. The elastic element is supported on the slider and on the contact carrier such that it can be tensioned by a displacement of the slider in relation to the contact carrier (in particular, in a spring-elastic manner) in order to bring about a displacement of the contact carrier in relation to the housing.

In this way, a plug connector part is provided, which is improved, in particular, to the effect that it is thus possible to ensure a rapid and safe disconnection of a connection with the corresponding mating plug connector part independently of external influences or a user of the plug connector part. The electrical connection is disconnected by moving the contact carrier in relation to the housing as a result of the (pre)tension of the elastic element. Therefore, the user can hold the housing in his hand during the separation without impairing the separation. Thus, damage or injuries due to an arc can be avoided particularly reliably. The plug connector part comprises three components that can be moved in relation to one another, namely the housing, the contact carrier, and the slider. A tensioning of the elastic element takes place, for example, by compression or stretching.

The plug connector part can comprise at least one electrically conductive element, which enables a displacement of the at least one electrical contact in relation to a conductor connection, for example in the form of a flexible electrical conductor, along a plug-in direction of the plug connector part.

The plug connector part comprises, for example, a locking element, in particular in the form of a latching element, for detachably locking the contact carrier to the mating plug connector part. This makes it possible to trigger a defined separating movement independently of the speed at which the user removes the plug connector from the mating plug connector.

In a development, the slider and the locking element are formed such that a displacement of the slider in relation to the contact carrier first brings about a tensioning of the elastic element and thereupon (after a predetermined displacement path) an actuation of the locking element. This ensures that the same force always acts on the contact carrier when the locking element is actuated (in order to release it from the mating plug connector part).

The locking element can be fixed to the contact carrier, for example fastened thereto or formed thereon. Optionally, the locking is formed integrally with the contact carrier. This enables a particularly robust and simple structure.

In one embodiment, the locking element is guided (for example, in a longitudinally movable manner) in a guide of the slider. This also enables a particularly simple structure and also the visual inspection of the locking state.

The locking element can have an unlocking section, in particular in the form of a bevel. The unlocking section (in particular the bevel) can be configured to interact with an associated unlocking section of the slider, in particular in the form of a bevel, in order to actuate the locking element in such a way that it is transferred from a locked position into an unlocked position.

The plug connector part can be plugged onto the mating plug connector part along a plug-in axis, for example, and in particular can be plugged onto or into the mating plug connector part, wherein the elastic element can be tensioned, for example compressed, in particular in a direction parallel to the plug-in axis.

Optionally, the elastic element takes the form of a spring, in particular a spiral spring. This allows a particularly simple and robust design. Alternatively, for example, a piece of rubber is also conceivable as a simple and robust elastic element. Furthermore, the plug connector part can comprise two or more elastic elements, in particular spiral springs, which can effectively prevent tilting.

The contact carrier can comprise one or more electrical contacts, for example two contacts for a direct current (DC) connection. Each of the electrical contacts is configured to contact an electrical contact of the mating plug connector. An additional electrical contact for a protective conductor (PE) can be firmly attached to the housing. In this case, the elastic element(s) can move all contacts of the contact carrier simultaneously in order to pull them off the mating plug connector part. Depending on the plug-in depth, a plurality of contacts can be separated simultaneously or sequentially. Despite a plurality of contacts, the plug connector part can have a particularly simple structure.

For example, at least one conductor connection for the firm connection of an electrical conductor is fixed to the housing, for example fastened thereto. A conductor can be detachably or non-detachably connected to the conductor connection.

Optionally, the at least one conductor connection on the housing is connected to the at least one electrical contact (or each of a plurality of conductor connections to each of a plurality of electrical contacts) by an electrically conductive element (in particular, by a flexible electrical conductor), which is formed to bridge a variable length. This enables a simple and simultaneously secure electrical connection of the two components movable in relation to one another. A flexible stranded wire, for example stranded copper wire, or a flexible braid, for example copper braid, serves as a flexible electrical conductor. Alternatively, the use of a sliding contact is possible, for example.

The slider can take the form of a sliding sleeve. Furthermore, the slider can be formed and arranged such that it partially or completely surrounds the housing and/or the contact carrier on the outside. This enables a particularly simple operation. The slider can have grip surfaces for manual actuation.

The contact carrier can be accommodated at least partially in the housing. This enables a particularly simple guidance on the housing, for example.

According to one aspect, a plug connector is provided, which comprises a plug connector part according to any embodiment described herein and a mating plug connector part that can be brought into plug-in engagement with the plug connector part.

According to one aspect, a method is provided for separating a plug connector part from a mating plug connector part, wherein the plug connector part comprises the following: a housing, a contact carrier that can be moved in relation to the housing with at least one electrical contact for the mating plug connector part, a slider that can be moved in relation to the housing and to the contact carrier, optionally a flexible electrical conductor or another element that can be changed in length for the transmission of current, and an elastic (for example, spring-elastic) element that is supported on the slider and on the contact carrier, wherein the elastic element is tensioned by a displacement of the slider in relation to the contact carrier. As a result, a displacement of the contact carrier in relation to the housing can be brought about, and the contact carrier can be removed from the mating plug connector part, whereby the plug connector part is separated from the mating plug connector part.

In the method, the plug connector part according to any embodiment described herein can be used.

Figure 2:
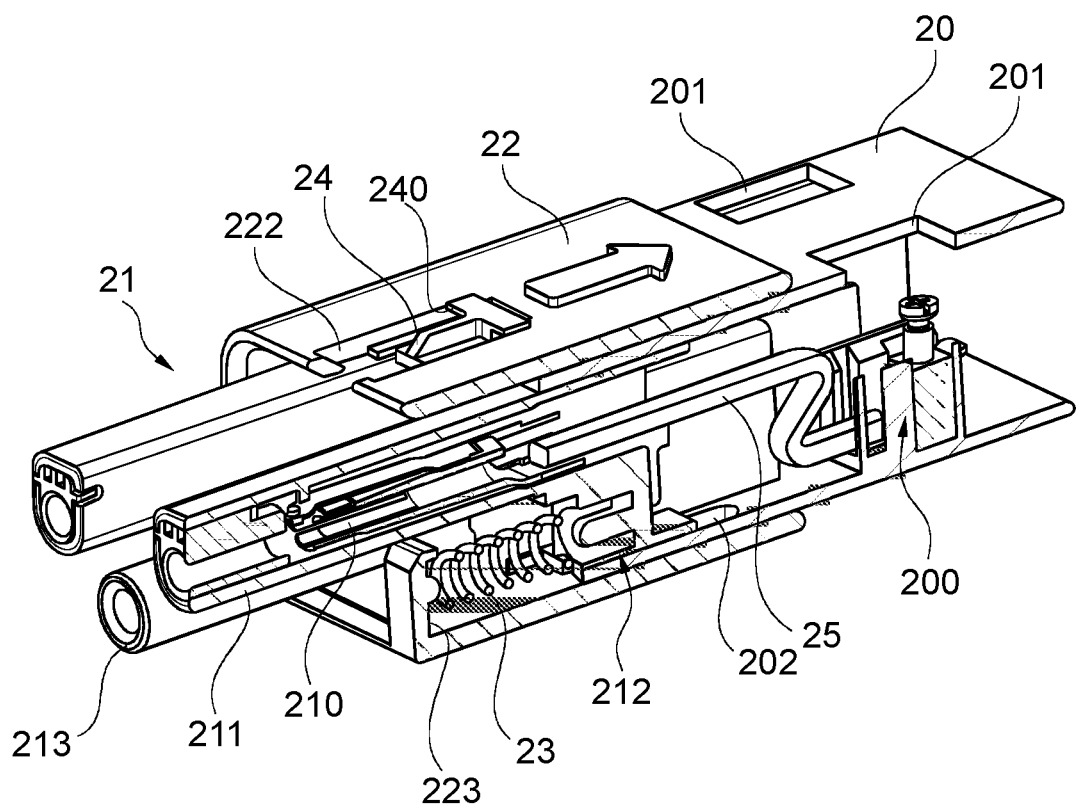
FIG. 2 shows a sectional view of the plug connector part according to FIG. 1.

FIG. 1 shows the plug connector 1. The plug connector 1 comprises a plug connector part 2 for a releasable electrical connection to a mating plug connector part 3 and the mating plug connector part 3. FIG. 2 shows in particular internal components of the plug connector part 2.

The plug connector part 2 comprises a housing 20 and a contact carrier 21 having a plurality of electrical contacts 210. The plug connector part 2 can be plugged into the mating plug connector part 3 in one direction along a plug-in axis S and can be pulled off in the opposite direction (see FIG. 1). In the present case, the mating plug connector part 3 can be mounted in a housing wall, which, however, is only an exemplary embodiment.

The contact carrier 21 of the plug connector part 2 comprises a plurality of contact pins 211, which can be plugged into contact receptacles 30 of the mating plug connector part 3. Electrical contacts 31, here in the form of a pin, are arranged in the contact receptacles 30 in order to be electrically contacted by the corresponding electrical contacts 210 of the plug connector part 2. In the present case, the plug connector part 2 and the mating plug connector part 3 each comprise three electrical contacts 31, wherein specifically two contacts are respectively provided for a DC connection. In the present case, the contact carrier 21 is a load contact carrier. A protective conductor contact 213, shown in FIG. 2 below the other two electrical contacts, in the case of the plug connector part 2, as in the example shown, can be firmly attached to the housing 20 or alternatively can be formed with on the contact carrier 21.

In each case, an electrical contact 210 of the plug connector part 2 is arranged inside one of the contact pins 211, as shown in particular in FIG. 2. The electrical contacts 210 of the plug connector part 2 each form a receptacle, in which one pin-shaped electrical contact 31 each of the mating plug connector 3 can be accommodated in order to establish an electrical contact.

In particular, with reference to FIG. 2, it can also be seen that the contact pins 211 of the plug connector part 2 constitute parts of the contact carrier 21. In the present case, the contact pins 211 project from a common base. In the example shown, the contact pins 211 and the common base of the contact carrier 21 are integrally formed. The contact carrier 21 is made of an insulating material.

The contact carrier 21 is movably mounted on a housing 20 of the plug connector part 2. Thereby, the contact carrier 21 is movable along the plug-in axis S in relation to the housing 20. A part of the contact carrier 21 is arranged inside the housing 20. The housing 20 has one or more slotted links 202, into which (in each case) a section of the contact carrier engages in order to define the displacement path of the contact carrier 21 on the housing 20.

A plurality of conductor connections 200 is provided on the housing 20. An electrical conductor, for example a cable, can be firmly connected, specifically screwed, to each conductor connection 200, in the present case by means of a screw clamp. Access openings 201 for the conductor connections 200 are formed in an opposite housing wall of the housing 20 so that the conductor connections 200 can be tightened and optionally also released by a tool, for example a screwdriver.

In each case, one of the conductor connections 200 is electrically connected to one of the electrical contacts 210 of the plug connector part 2, in the present case by means of a flexible electrical conductor 25 in each case. The flexible electrical conductor 25 can be bent in such a way that it does not impede the displacement movement of the contact carrier 21 in relation to the housing 20 or impedes it only in a negligible manner. In the present case, the flexible electrical conductor 25 is arranged in the housing 20 with an S-twist (see FIG. 2). The flexible electrical conductors 25 each take the form of a bendable stranded copper wire.

The plug connector part 2 furthermore comprises a slider in the form of an outer sliding sleeve 22. The sliding sleeve 22 accommodates both parts of the housing 20 and parts of the contact carrier 21. In at least one configuration of the plug connector part 2, a section of the sliding sleeve 22 surrounds a section of the housing 20, which surrounds a section of the contact carrier 21. The plug connector 1 is a push-pull plug connector. Grip sections 221 (in the present case, fluted) are formed on the sliding sleeve 22, on which grip sections a user can grip the sliding sleeve 22 in order to plug the plug connector part 2 into the mating plug connector part 3, and to once again release the plug connector part 2 from the mating plug connector part 3.

The sliding sleeve 22 is mounted on the housing 20 so as to be movable in relation to the contact carrier 21 and to the housing 20 (along the plug-in axis S). A plurality of (in the present case, two) elastic elements 23, here in the form of spiral springs, is arranged between the contact carrier 21 and the sliding sleeve 22. In the sectional view of FIG. 2, one of the elastic elements 23 is visible; the other is arranged symmetrically thereto. The elastic elements 23 are respectively supported on the sliding sleeve 22 and on the contact carrier 21. In the present case, for each elastic element 23, a support point 212 is provided on the contact carrier 21 and a support point 223 is provided on the sliding sleeve 22. The respective elastic element 23 is securely held at the support points 212, 223. A displacement of the sliding sleeve 22 in relation to the contact carrier 21 tensions the elastic elements 23 in a spring-elastic manner.

The plug connector part 2 furthermore comprises a locking element 24. The locking element 24 is formed integrally with the contact carrier 21, alternatively firmly mounted thereon. The locking element 24 projects in parallel to the plug-in axis S from the contact carrier 21, specifically from its base. A part of the locking element 24 is accommodated in a guide 220 of the sliding sleeve 22. The guide is formed as a slot aligned in parallel to the plug-in axis S. The locking element 24 has actuating surfaces, here in the form of bevels 240. For this purpose, the sliding sleeve 22 has suitably arranged actuating surfaces, here likewise in the form of bevels 222. The bevels 222 of the sliding sleeve 22 are arranged at an end of the sliding sleeve 22 (facing the mating plug connector part 3 in the plugged state). If the sliding sleeve 22 is moved in relation to the contact carrier 21 such that the bevels 240, 222 come into contact with one another and slide along one another, an end section of the locking element 24 (substantially perpendicular to the plug-in axis S) is lifted.

Figure 3A:
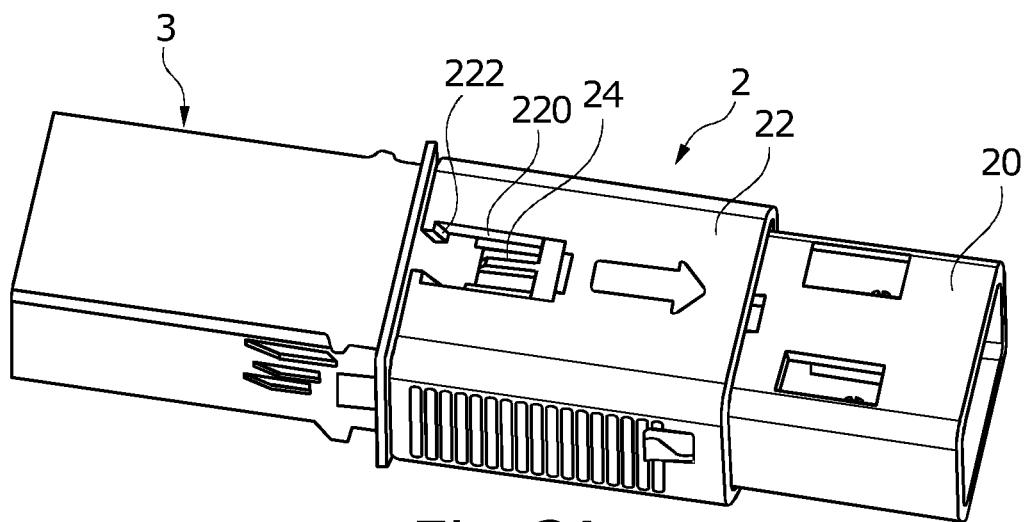
FIG. 3A shows the plug connector according to FIG. 1, wherein the plug connector part and the mating plug connector part are connected and locked to one another.

A latching element is formed on the locking means 24. If the plug connector part 2 is plugged onto the mating plug connector part 3 until it is in an end position, the latching element of the locking element 24 latches with a latching element of a mating locking element 32 of the mating plug connector part 3. The mating locking element 32 of the mating plug connector part 3 (which is shown in particular in FIG. 1) has a recess, in which the latching element of the locking element 24 formed as a projection can engage. This state is shown in FIG. 3A. In the inserted and latched state, the plug connector part 2 is securely held on the mating plug connector part 3.

Figure 4A:
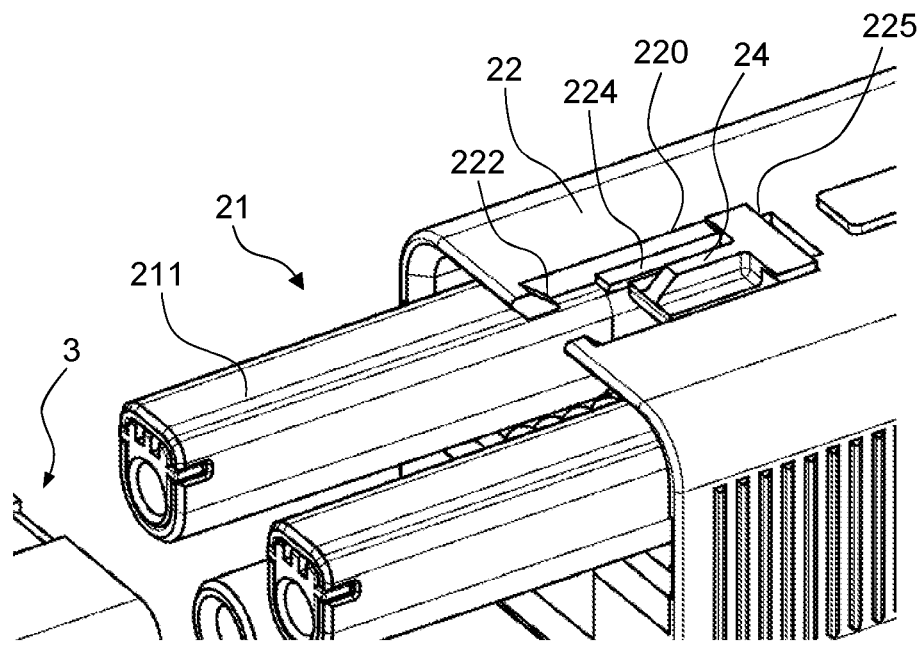
FIG. 4A shows details of the plug connector according to FIG. 1 from a different viewing direction.

In particular, with reference to FIG. 4A, it can be seen that the guide 220 has lateral rails 224, on which the locking element 24 can slide.

When viewed along the plug-in axis S, a gap is provided between the bevels 222 and the rails 224.

The end of the guide 220 facing away from the mating plug connector part 3 serves as a stop 225. If the plug connector part 2 is plugged onto the mating plug connector part 3, the stop 225 presses the contact carrier 21 against the mating plug connector part 3 via the locking element 24.

From the position shown in FIG. 3A, the sliding sleeve 22 can be moved in a direction away from the mating plug connector 3 in relation to the housing 20 of the plug connector part 2. The sliding sleeve 22 is substantially cuboid.

Figure 3B:
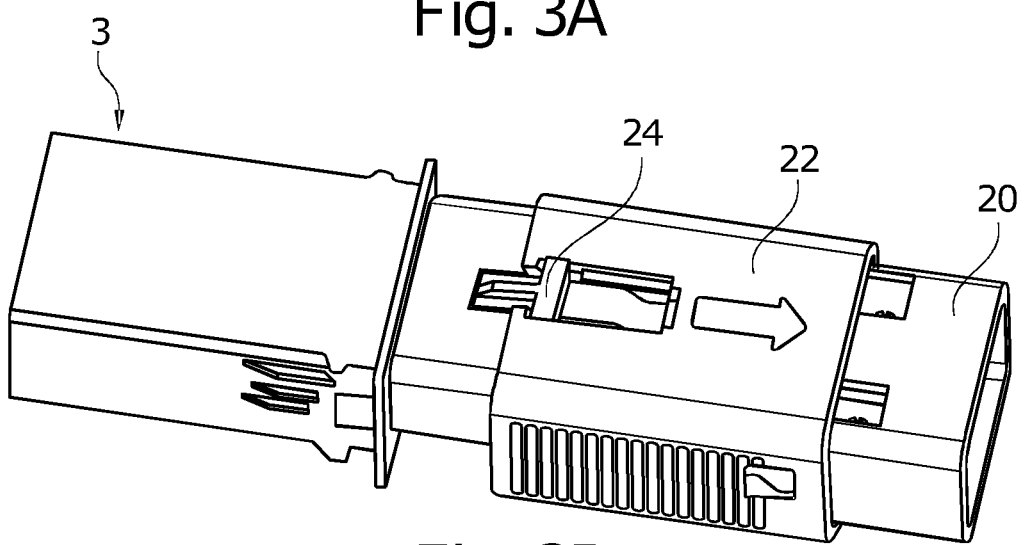
FIG. 3B shows the plug connector according to FIG. 1, wherein the plug connector part and the mating plug connector part are connected and locked to one another, and a slider of the plug connector part is moved away from the mating plug connector part in comparison to FIG. 3A.
Figure 4B:
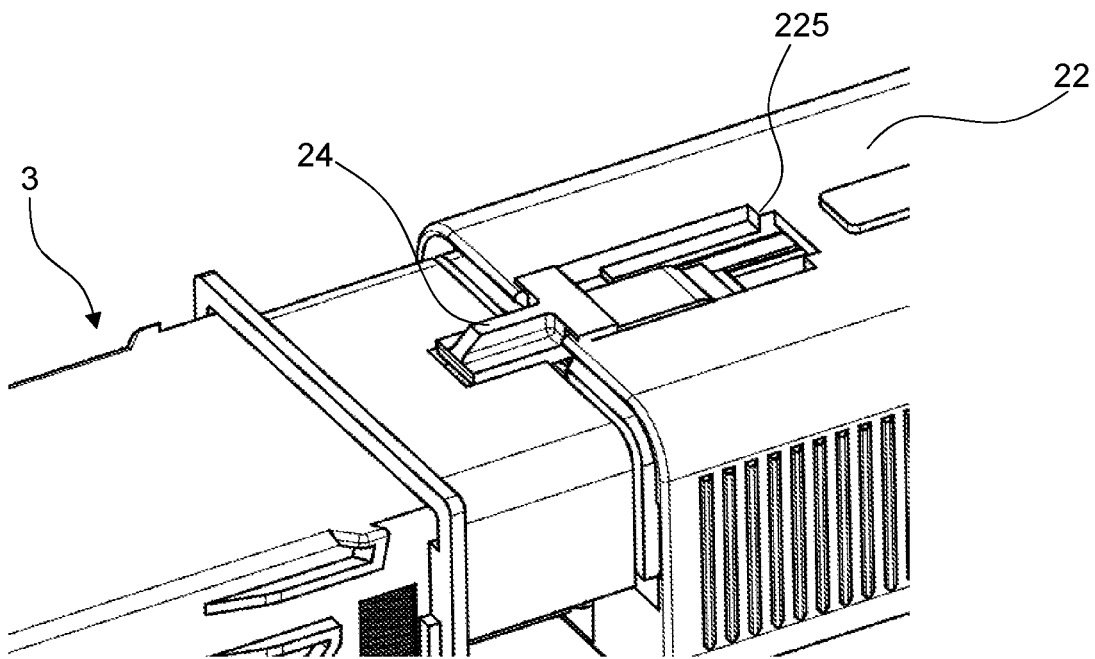
FIG. 4B shows details of the plug connector according to FIG. 1, wherein a locking is shown in a released state.

FIG. 3B shows a position of the sliding sleeve 22 in which the bevels 240, 222 of the locking element 24 and of the sliding sleeve 22 have just entered into contact with one another, but in which the locking element 24 is still latched to the mating locking element 32 of the mating plug connector 3. With reference to FIG. 2, it is clear that the elastic elements 23 are pretensioned in this position and, as a result of the displacement of the sliding sleeve 22, are compressed in a spring-elastic manner in the example shown. A further displacement of the sliding sleeve 22 causes the locking element 24 to be lifted (bent upward), as shown in particular with reference to FIG. 4B.

Figure 3C:
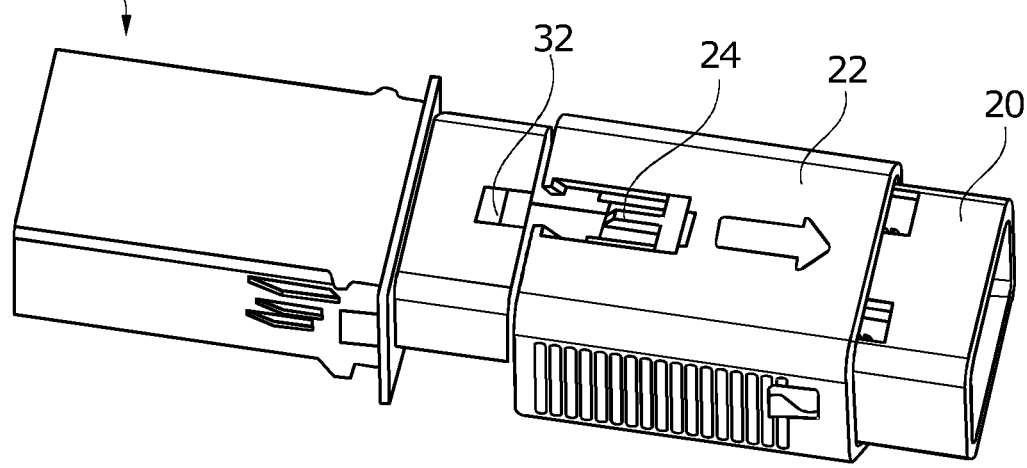
FIG. 3C shows the plug connector according to FIG. 1 in an unlocked state with removed electrical contacts.

FIG. 3C shows a state into which the plug connector part 2 is transferred if, starting from the position according to FIG. 3B, the sliding sleeve 22 is moved further away from the mating plug connector 3 so that the locking element 24 is lifted until the locking of the locking element 24 with the mating locking element 32 is released by lifting the projection out of the recess. As a result of the spring force of the pretensioned elastic elements 23, the contact carrier 21 moves away from the mating contact element 3 and in the direction of the end of the housing 20 of the plug connector part 2 facing away from the mating plug connector part 3 (in the pulling direction). A displacement of the sliding sleeve 22 in relation to the contact carrier 21 thus first brings about a tensioning of the elastic elements 23 and subsequently an actuation of the locking element 24. The use of elastic elements 23 makes it possible to achieve particularly high separation speeds and to ensure reliable and complete separation of the contacts. The movement of the contact carrier 21 in relation to the housing 20 is compensated by compression of the flexible electrical conductors 25.

The plug connector part 2 can then be removed from the mating plug connector part 3.

The sudden movement of the contact carrier 21 quickly removes the electrical contacts 210 of the plug connector part 2 from the electrical contacts 31 of the mating plug connector part 3 in such a way that the burning time of an arc is significantly reduced. In particular, a stationary arc is effectively avoided. In this respect, it is insignificant how quickly a user pulls on the sliding sleeve 22, because the separating pulling movement of the electrical contacts 210 of the plug connector part 2 takes place by means of the elastic elements 23 as soon as the locking is released. During this pulling movement, the position of the housing 20 of the plug connector part 2 in relation to the mating plug connector part 3 can initially remain unchanged. This has the advantage that whether or not a user holds the housing 20 with his other hand when pulling it on the sliding sleeve 22 is also irrelevant. Furthermore, this embodiment makes it possible for the plug connector 1 to be safely usable even in the case of very restricted space conditions.

It is also worth mentioning that the elastic elements 23 are not tensioned (compressed) when the plug connector part 2 is plugged onto the mating plug connector part 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Plug connector
2 Plug connector part
20 Housing
200 Conductor connection
201 Access opening
202 Slotted link
21 Contact carrier
210 Electrical contact
211 Contact pin
212 Support point
213 Protective conductor contact
22 Sliding sleeve (slider)
220 Guide
221 Grip section
222 Bevel
223 Support point
224 Rail
225 Stop
23 Elastic element
24 Locking element
240 Bevel
25 Flexible electrical conductor (electrically conductive element)
3 Mating electrical connector part
30 Contact receptacle
31 Electrical contact
32 Mating locking element
S Plug-in axis

The invention claimed is:

1. A plug connector part for electrical connection to a mating plug connector part, comprising:
a housing,
a contact carrier that is movable in relation to the housing and comprises:
at least one electrical contact for the mating plug connector part, and
a slider that is movable in relation to the housing and to the contact carrier, and
an elastic element that is supported on the slider and on the contact carrier in such a way that the elastic element is tensionable by a displacement of the slider in relation to the contact carrier in order to bring about a displacement of the contact carrier in relation to the housing and thus to remove the contact carrier from the mating plug connector part,
wherein at least one conductor connection is fixed to the housing for a firm connection of an electrical conductor, and
wherein the at least one conductor connection is connectable to the at least one electrical contact on the housing by an electrically conductive element that is variable in length.

2. The plug connector part according to claim 1, further comprising:
at least one electrically conductive element configured to enable a displacement of the at least one electrical contact in relation to a conductor connection along a plug-in direction of the plug connector part.

3. The plug connector part according to claim 1, further comprising:

a locking element for locking the contact carrier to the mating plug connector part.

4. The plug connector part according to claim 3, wherein the slider and the locking element are formed in such a way that a displacement of the slider in relation to the contact carrier first brings about tensioning of the elastic element and subsequently an actuation of the locking element.

5. The plug connector part according to claim 3, wherein the locking element is fixed to the contact carrier.

6. The plug connector part according to claim 3, wherein the locking element is guided in a guide of the slider.

7. The plug connector part according to claim 3, wherein the locking element has a bevel that is configured to interact with a bevel of the slider in order to transfer the locking element from a locked position into an unlocked position.

8. The plug connector part according to claim 1, wherein the plug connector part is pluggable into the mating plug connector part along a plug-in axis and the elastic element can be tensioned in a direction parallel to the plug-in axis.

9. The plug connector part according to claim 1, wherein the elastic element takes the form of a spiral spring or another springy element.

10. The plug connector part according to claim 1, wherein the contact carrier comprises a plurality of electrical contacts.

11. The plug connector part according to claim 1, wherein the slider takes the form of a sliding sleeve and at least partially surrounds the housing and the contact carrier on the outside.

12. The plug connector part according to claim 1, wherein the contact carrier is at least partially accommodated in the housing.

13. A plug connector, comprising:
a plug connector part according to claim 1; and
the mating plug connector part that is plug-in engageable with the plug connector part.

14. A method, comprising:
separating a plug connector part from a mating plug connector part, wherein the plug connector part comprises: a housing, a contact carrier that is movable in relation to the housing and comprises: at least one electrical contact for the mating plug connector part, and a slider that is movable in relation to the housing and to the contact carrier, and an elastic element that is supported on the slider and on the contact carrier, wherein the elastic element is tensioned by a displacement of the slider in relation to the contact carrier in order to bring about a displacement of the contact carrier in relation to the housing and thus to remove the contact carrier from the mating plug connector part,
wherein at least one conductor connection is fixed to the housing for a firm connection of an electrical conductor, and
wherein the at least one conductor connection is connectable to the at least one electrical contact on the housing by an electrically conductive element that is variable in length.

15. A plug connector part for electrical connection to a mating plug connector part, comprising:
a housing,
a contact carrier that is movable in relation to the housing and comprises:
at least one electrical contact for the mating plug connector part, and
a slider that is movable in relation to the housing and to the contact carrier,
an elastic element that is supported on the slider and on the contact carrier in such a way that the elastic element is tensionable by a displacement of the slider in relation to the contact carrier; and
a locking element for locking the contact carrier to the mating plug connector part,
wherein the locking element is fixed to the contact carrier.

* * * * *